United States Patent [19]

Levine

[11] 4,092,978

[45] June 6, 1978

[54] SOLAR ENERGY COLLECTOR

[76] Inventor: Richard S. Levine, R.R. No. 5, Kidville La., Lexington, Ky. 40511

[21] Appl. No.: 713,624

[22] Filed: Aug. 11, 1976

[51] Int. Cl.² .......................... F24J 3/02; F28F 13/00
[52] U.S. Cl. .................................. 126/270; 237/1 A; 165/146
[58] Field of Search .............. 126/270, 271; 237/1 A; 165/146, 147

[56] References Cited

U.S. PATENT DOCUMENTS

| 679,451 | 7/1901 | Baker | 126/271 |
|---|---|---|---|
| 695,136 | 3/1902 | Baker | 126/271 |
| 2,998,006 | 8/1961 | Johnston | 126/271 |
| 3,631,819 | 1/1972 | Houchman | 165/146 X |
| 3,739,841 | 6/1973 | Small et al. | 165/146 |
| 3,919,998 | 11/1975 | Parker | 126/271 X |
| 3,994,276 | 11/1976 | Pulver | 126/270 |
| 4,019,494 | 4/1977 | Safdari | 126/270 |

Primary Examiner—William F. O'Dea
Assistant Examiner—Larry Jones

Attorney, Agent, or Firm—Michael Ebert

[57] ABSTRACT

An inexpensive and efficient solar energy collector formed by a thermally-insulated channel covered by a transparent plate assembly to define an elongated passage having an input end into which air is admitted, and an output end from which air is discharged. The channel is divided into a series of stages each having a heat exchange section therein which acts to transfer absorbed heat to the air flowing therethrough, whereby cool air entering the channel is raised in temperature in the course of its passage. The effective surface area of the heat exchange sections increases progressively in the successive stages, so that as the temperature difference between the air and exchange sections is reduced as the air passes through the stages, the area of exchange increases to maintain a rapid rate of heat transfer. To maximize the heat retention in relation to the radiation acceptance in each stage, the transparent cover assembly is formed by plates whose number is stepped up from the input to the output stage.

14 Claims, 5 Drawing Figures

U.S. Patent   June 6, 1978   4,092,978
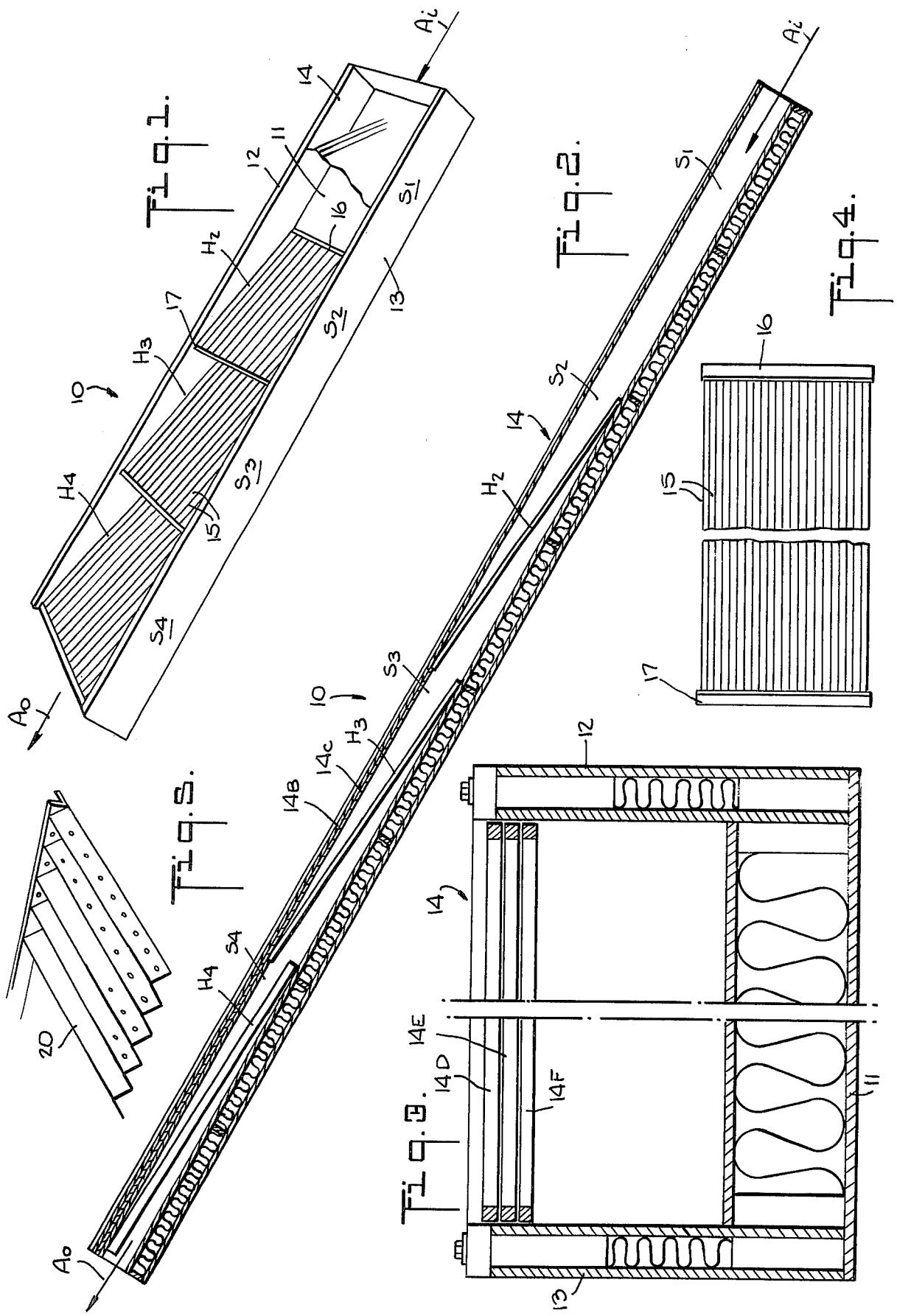

SOLAR ENERGY COLLECTOR

BACKGROUND OF INVENTION

This invention relates generally to heliothermal systems, and more particularly to a solar energy collector for heating fluid passing therethrough.

With the growing scarcity of fossil fuels and their sharply rising cost, it is becoming ever more apparent that a pressing need exists for an inexpensive and abundant energy source. The inexhaustible nature of solar energy and its significant magnitude over small collection areas is such as to encourage its exploitation, even at low efficiencies of recovery. Despite variations encountered in solar radiation in the course of a day, this energy can be used in a heliothermal process in which the incident radiation is absorbed and converted into heat for heating air or water to moderate temperature levels for house heating and domestic hot water.

For the typical home-owner with limited funds, the most immediate concern is the initial cost of an investment in a solar collector. Though collectors are available that are reasonably efficient and reflect a high order of technology, in some instances the price of such collectors puts them beyond the reach of the ordinary householder. Other important criteria are simplicity and durability, for the typical home-owner usually functions as his own handyman and cannot afford to engage professional assistance to maintain a sophisticated solar collector.

Hence the ideal domestic solar collector is a durable, low-cost structure of uncomplicated design which is easily maintained and yet is characterized by a high order of operating efficiency. Because solar collectors of the type heretofore available for domestic applications fall far short of this ideal, their use has been quite limited, and homes, by-and-large, continue to be heated with expensive air-polluting fossil fuel.

In solar collectors, incoming solar radiation is received through a transparent cover plate and is intercepted by a heat exchanger which absorbs heat and transfers heat to a fluid. This cover, which is formed of glass or clear plastic material, plays a vital role in determining the efficiency of the collector. Solar energy reaches the earth as electromagnetic radiation in the wavelength band between 0.3 and 3.0$\mu$, with its peak spectral intensity near 0.5$\mu$. When solar radiation falls on a transparent cover, a part of the energy is transmitted, a part absorbed, and the remainder is reflected. These solar-optical properties depend on the wavelength, the incident angle and the composition of the cover plate.

For clear glass, the solar transmittance at an angle of incidence of 0° is about 0.90, but the transmittance for long-wave radiation (5$\mu$) is virtually zero. The transmittance falls and the reflection rises as the incident angle increases. Hence a glass cover plate acts as a heat trap by admitting solar radiation freely, but retaining most of the absorbed sunshine.

The efficiency of a solar energy collector is therefore partly a function of the solar-optical properties of the cover plate. To attain a high operating efficiency, the cover plate design must be such as to optimize the amount of solar radiation in the visible light range which is permitted to enter the collector and to minimize the amount of absorbed energy in the form of infra-red or heat radiation that is permitted to leak out through the same cover plate. Heat is lost through the cover plate by a combination of radiation, convection and thermal conduction.

It is well known that in order to cut down the heat loss from a solar collector, one may use a cover assembly formed by several transparent plates rather than a single panel. Thus in the Telkes U.S. Pat. No. 2,595,905, the cover is constituted by a pair of glass plates having a dead air space therebetween, the assembly admitting solar energy to the collector but acting as an effective heat insulator to prevent the outward escape of heat by radiation, conduction and convection. The Telkes patent points out that more than two transparent plates may be used for the same purpose.

The disadvantage of a multi-layer cover is that the reduction in heat loss effected thereby is accompanied by a decrease of incoming radiation, for each layer of the cover acts to reduce incoming visible energy by 10 to 15%. However, in designing a solar collector cover for a specified fixed operating condition, it is a relatively easy matter to determine the number of cover layers which afford the optimum trade-off between heat loss and optical transmission.

Another factor that significantly affects the performance of a solar collector is the quantity of heat exchange surface inside the collector. Opaque materials absorb or reflect all the incident sunshine. The absorptance $\alpha$ for solar radiation, and the emittance $\epsilon$ for long-wave radiation at the temperature of the receiving surface are particularly important in heliotechnology. For a true black body, the absorptance and emittance are equal and do not change with wavelength. But most real surfaces have heat reflectances and absorptances which may vary with wavelength. Solar collectors benefit from a high $\alpha/\epsilon$ ratio, while surfaces which should remain cool, such as rooftops, should have low ratios, since the objective usually is to absorb as little solar radiation and emit as much long-wave radiation as possible. Aluminum foil has a consistently low absorptance and a high reflectance over the entire spectrum from 0.25 to 25$\mu$, whereas black paint has a high absorptance and a low reflectance.

The heat exchange surface within the solar collector is typically a black-surfaced metal which transfers heat to the operating fluid, usually water or air. When the temperature of the operating fluid is much below the temperature of the heat exchange surface, heat is transferred very rapidly to the fluid, but as the temperature of the fluid rises and approaches equilibrium with that of the heat exchange surface, the rate of exchange slows down. In order, therefore, to effect a greater rate of heat exchange, a larger quantity of heat exchange surface is required. For specified operating conditions of a solar collector wherein the fluid input temperature, the flow rate and the internal collector temperature have known fixed values, one can readily calculate the required heat exchange area.

There are two reasons why the correct design of the metal heat exchange area is important. First, the area of heat exchange must be sufficient to effect maximum transfer of heat from the metal to the operating fluid so that the heat can be fully exploited. Second, the more heat that is transferred to the fluid, the cooler the collector runs, and the cooler the collector, the lesser is the amount of heat that is radiated toward the cover plate. By reducing the amount of radiated heat, one minimizes the heat loss from the system and thereby enhances the operating efficiency of the collector.

Thus in the theoretical case of a solar collector of conventional design operating under fixed, steady state conditions, it is a relatively simple matter to determine the number of cover plates and the area of heat exchange surface required to achieve optimum performance characteristics. But in a real situation where the motion of the sun and the vagaries of the weather represent complex variables and where practical considerations dictate the use of a bank of solar energy collectors hooked in series or in parallel relation, the actual performance of these collectors is often greatly at variance with predictions based on theoretical calculations.

In dealing with heliothermal systems, one must draw a distinction between economic and operating efficiency. The operating efficiency of any thermal energy conversion system, including a solar energy collector, is determined by the ratio of heat obtainable to useful heat received. But economic efficiency is measured by heat units obtainable per unit time and per dollar invested. Because low-level free energy is obtainable in great abundance within a relatively small area, one may tolerate a low operating efficiency if the system is inexpensive. Obviously, the desideratum is a system of the lowest possible cost and of the highest possible efficiency. In evaluating the comparative efficiency of solar energy systems, the most practical system is the one that generates the greatest useful energy output per dollar invested.

SUMMARY OF INVENTION

In view of the foregoing, it is the main object of this invention to provide a simple, durable and economic solar energy collector which is easily maintained, the collector being characterized by a high order of operating efficiency.

More particularly, it is an object of this invention to provide an integrated solar energy collector having graduated stages wherein the number of cover plates varies from the input to the output stage thereof and wherein the surface area of heat exchange sections in the successive stages is least at the input stage and greatest at the output stage.

Also an object of the invention is to provide a practical low-cost solar energy collector that is a fully insulated and waterproof structure that can either be prefabricated or constructed on the job site. The collector lends itself to integration in the roof of the building, so that the cost of the collector represents a relatively minor additional cost over the cost of a conventional roof.

A salient feature of a solar collector in accordance with the invention is that the same collector structure is operable in the winter to supply warm air to heat the interior of the house, and in the summer to draw warm air from the interior and thereby provide ventilation without the use of fans or other power-operated means.

Briefly stated, these objects are attained in a collector comprising a thermally-insulated channel covered by a transparent plate assembly to define an elongated passage having an input end into which air is admitted, and an output end from which air is discharged. The channel is divided into a series of stages, each having a heat exchange section therein which acts to transfer absorbed heat to the air flowing therethrough, whereby cool air entering the channel is raised in temperature in the course of its passage.

The effective surface area of the heat exchange sections increases progressively in the successive stages, so that as the air heats up in the course of its passage through the stages, the area of exchange increases to maintain a rapid rate of heat transfer. The transparent cover assembly is formed by plates whose number is stepped up from the input to the output stage so as to maximize the heat retention in relation to the radiation acceptance in each stage.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a solar energy collector in accordance with the invention, the cover assembly being removed;

FIG. 2 is a longitudinal section taken through the collector;

FIG. 3 is a transverse section taken in the plane indicated by line 3—3 in FIG. 2;

FIG. 4 is a plan view of one of the heat exchange sections; and

FIG. 5 is a modified form of a heat exchange section.

DESCRIPTION OF INVENTION

Referring now to FIG. 1, there is shown a solar energy collector 10 in accordance with the invention, the collector being mounted on the roof of an existing building or integrated into the structure of the roof at the time of its construction. The orientation of the collector is preferably such as to receive the maximum amount of available sunlight. Thus in the northern hemisphere, the collector would be placed at a southern exposure and at an angle to the horizontal that would maximize its performance for its given latitude and intended seasonal use.

The collector is formed by a channel-shaped structure constituted by a hollow double-wall base 11 and a pair of hollow double-wall side pieces 12 and 13. These pieces are preferably made of plywood panels whose interior is filled with suitable thermal insulation or batting.

The channel is covered and sealed by a transparent cover assembly, generally designated by numeral 14, to define an elongated flow passage for air admitted at input end $A_i$ and discharged at output end $A_o$.

The flow passage in the channel is divided into a series of four stages, $S_1$, $S_2$, $S_3$ and $S_4$. Each contains a heat exchange section to absorb heat derived from the incident sunlight transmitted through the cover assembly and to transfer the heat to the air passing through the flow passage, so that the temperature of the relatively cool air entering input end $A_i$ is raised in the course of passage and is discharged as warm air, which may be used to heat water or to warm the interior of the building. It is to be understood that while a system composed of a series of four stages is disclosed, in practice a smaller or larger number of stages may be used.

Inasmuch as the air entering first stge $S_1$ is cool, the heat exchange section in this stage may simply be the channel walls which are warmed by the incoming rays to produce heat which is transferred to the flowing air. In the succeeding stages, $S_2$, $S_3$ and $S_4$, heat exchange sections $H_2$, $H_3$ and $H_4$ are formed by an array of longitudinally-extending parallel thin strips of metal, preferably aluminum foil, which are bridged between two heavy cross-bars, so that the upper edges of the strips face the cover assembly.

Each heat exchange section, as illustrated separately in FIG. 4 in connection with section $H_2$, is constituted by parallel metal strips or foils 15 stretched between an upstream cross-bar 16 and a downstream cross-bar 17. Upstream cross-bar 16 is installed in the channel adjacent base 11 at the junction of stages $S_1$ and $S_2$, while downstream cross-bar 17 is placed at the junction of stages $S_2$ and $S_3$ just below cover assembly 14. The air flowing through stage $S_2$ passes between the foils, as a consequence of which heat from the foils is transferred thereto.

Because the array of foils is tilted with respect to the longitudinal air flow axis, the air impinges on the downstream portion of the foil array adjacent the base before reaching the upstream portion of the foil array adjacent the cover assembly. Hence the air running just below cover assembly 14 is cooler than the air running just above base 11. This air flow relationship tends to keep the cover assembly fairly cool, thereby minimizing heat losses and raising the operating efficiency of the system. The parallel fins do not significantly obstruct air flow, even though they serve as an efficient heat transfer medium.

It is important to note that fins 15 of stage $S_2$ have a relatively small width, and that fins 18 in heat exchange section $H_3$ of stage $S_3$ are somewhat broader in width, while the width of fins 19 of exchange section $H_4$ in final stage $S_4$ are still broader. Thus in stage $S_1$, where the heat exchange means is constituted only by the walls of this stage, the overall heat exchange surface is small as compared to the surface formed by the area of fins 15 in stage $S_2$, and the effective heat exchange surface is still greater in stage $S_3$ which has broader fins 18. The greatest amount of heat exchange surface is found in stage $S_4$ whose fins 19 are broadest. Thus the area of heat exchange is smallest in input stage $S_1$ and increases progressively to attain its highest value in output stage $S_4$.

This graduated heat exchange surface is significant; for as the air heats up in the course of its passage through the successive stages, it is essential that the amount of effective heat exchange area be increased to maintain a high heat exchange rate. As pointed out previously, there must be sufficient heat exchange area to transfer the maximum amount of heat from the metal to the operating fluid (gas or liquid) so that this heat can be fully utilized. Moreover, the more heat transferred to the fluid, the cooler the collector runs. With a cooler collector, less heat is radiated out to the cover plate, and with a reduced heat loss, a more efficient collector is realized.

As one goes from the upstream or input end of the collector to the downstream or output end, the interior of the collector becomes hotter and the tendency of the collector to lose heat through the cover assembly increases. The collector is relatively cool in the first two stages $S_1$ and $S_2$, and in order to maximize the amount of incident radiation received by the collector, cover assembly 14 in these two stages is formed by a single transparent pane 14A which affords maximum transmission into the collector and is adequate in the first stages to minimize heat loss by a combination of convection, conduction and radiation within the collector.

But in the third stage $S_3$, which runs moderately hot in order to minimize heat loss, two panels 14B and 14C are employed in the cover assembly, with an air space therebetween. In the fourth stage $S_4$, which runs hottest, three panels 14D, 14E and 14F are provided with air spaces therebetween. Thus the number of panels is stepped from the input to the output end so that total heat retention is maximized by balancing reduced heat loss due to the multiple cover plates against their lowered solar transmission.

In lieu of parallel strips of metal to create a heat exchange array, each heat exchange section may be constituted, as shown in FIG. 5, by a single sheet of metal 20, such as aluminum or copper, which is uniformly corrugated to increase the heat transfer area, the metal being perforated to permit the flow of air therethrough. To provide a graduated surface area from stage to stage, the angle between corrugations is increased from stage to stage. To support the sheet of corrugated metal, the cross-bars may be in angle-iron form.

When using the solar energy collector in winter months, air blown through the collector and heated thereby is returned to the interior of the dwelling for use in heating. But in summer months, the warm air from the interior may be directed into the input end of the collector and the output end vented into the atmosphere. In this instance, the collector acts as a solar chimney; for as the solar-heated air escapes into the atmosphere, it draws warm air from the interior. Thus the collector operates in the manner of an attic fan in ventilating the structure, except that no power is necessary for this purpose.

In practice, the metal in the heat exchange section may be shiny or provided with a flat black, glossy black or a selective surface. The collector structure in accordance with the invention is fully insulated and waterproof, and because it can be a simply carpentered unit, it can either be prefabricated or constructed on the job site. Its structural characteristics are such that the collector can be fully integrated into the construction of a building whereby having built the collector system, the entire roof has been built as well.

Roofing, waterproofing, insulation and structure are all provicded by the collector structure. Thus the cost of the collector represents a small additional cost to that of a conventional roof, as contrasted to any modular system wherein all of these functions must be built and paid for twice over. The fact that the construction of the collector involves a simple carpentry operation means that it can be inexpensively integrated without difficulty into the construction of a typical wood frame construction building.

Whiel there have been shown and described preferred embodiments of a solar collector in accordance with the invention, it will be appreciated that many changes and modifications may be made therein without, however, departing from the essential spirit thereof. Thus the stages of the system, instead of being embodied into a single integrated collector structure, may be formed by a series of interlinked distinct structures.

I claim:
1. A solar energy collector comprising:
   A. an elongated open channel exposed to solar energy;
   B. a transparent cover assembly disposed over said channel to admit said solar energy and to define an elongated passage having an input end into which cold air is admitted and an output end from which warm air is discharged, said channel being effectively divided into a series of stages;
   C. heat exchange means disposed within each stage of the channel to absorb heat from solar energy transmitted through the cover assembly and to transfer the heat to the air passing through the channel, said means having an effective surface area which increases progressively in the successive stages so that as the temperature difference between the air and the heat exchange means is reduced as the air passes through the successive stages, the surface area of the exchange means increases to maintain a rapid rate of transfer whereby each stage operates at close to optimum efficiency.

2. A collector as set forth in claim 1, wherein said air is drawn from the interior of a building on whose roof the collector is mounted.

3. A collector as set forth in claim 1, wherein said cover assembly is formed by plates whose number is stepped up from the input to the output stage.

4. A solar energy collector as set forth in claim 3, wherein said input stage has a single plate, and said output section has three plates.

5. A collector as set forth in claim 3, wherein said plates are formed by glass panes in parallel relation to provide dead air spaces therebetween.

6. A solar energy collector as set forth in claim 1, in which the heat exchange means in at least one of said stages is formed by an array of parallel metal strips whose upper edges face said plate assembly.

7. A solar energy collector as set forth in claim 6, in which said strips are inclined relative to the cover assembly.

8. A solar energy collector as set forth in claim 6, wherein said strips in one of said sections has a width which is greater than the strips of a preceding section to provide a greater effective surface area.

9. A collector as set forth in claim 6, wherein said strips are formed by aluminum foil.

10. A collector as set forth in claim 1, wherein the heat exchange means is formed by a sheet of corrugated metal having apertures therein to permit air flow therethrough.

11. A collector as set forth in claim 10, wherein the angle between corrugations of the heat exchange means in successive sections increases to provide a greater effective surface area from stage to stage.

12. A collector as set forth in claim 11, wherein said aluminum has a black heat-absorbing surface layer thereon.

13. A collector as set forth in claim 10, wherein said sheet is formed of aluminum.

14. A heliothermal system comprising a series of stages through which air is conducted to extract heat from the incident rays of the sun and to transfer the heat to the air passing therethrough, each stage having a transparent cover through which the rays are transmitted and heat exchange means therein to absorb heat from said rays, said means having an effective surface area which increases progressively in the successive stages so that as the temperature difference between the air and the heat exchange means is reduced in the course of fluid passage through successive stages, the effective surface area of said means is increased to maintain a rapid rate of transfer, said transparent cover in a succession of stages in the series thereof being constituted by more than one plate, the number of plates increasing from stage to stage in the succession.

* * * * *